United States Patent

[11] 3,588,230

| [72] | Inventor | Thomas H. De Rieux<br>Washington, D.C. |
|---|---|---|
| [21] | Appl. No. | 790,685 |
| [22] | Filed | Jan. 13, 1969 |
| [45] | Patented | June 28, 1971 |
| [73] | Assignee | The United States of America as represented by the Secretary of Navy. |

[54] ADJUSTABLE LENS MOUNT
4 Claims, 2 Drawing Figs.

[52] U.S. Cl. .................................................. 350/252,
350/285, 350/287, 350/288
[51] Int. Cl. ...................................................... G02b 7/02
[50] Field of Search .......................................... 350/247,
16, 242, 115 (T)

[56] References Cited
UNITED STATES PATENTS

| 3,359,849 | 12/1967 | Friedman .................... | 350/247UX |
| 3,409,350 | 11/1968 | Call ............................ | 350/16X |

FOREIGN PATENTS

| 307,187 | 3/1932 | Germany .................... | 350/247 |

Primary Examiner—John K. Corbin
Assistant Examiner—Michael J. Tokar
Attorneys—R. S. Sciascia, M. L. Crane and A. L. Branning ABSTRACT: This disclosure is directed to a mount for optical elements such as mirrors, lens, prisms, etc. which enables one to make a fine adjustment in both the horizontal and vertical directions for precision alignment. The mount is thin and the adjusting means are positioned on the side such that the mount may be adjusted for wide angle use and for closely stacking the elements in an optical system.

PATENTED JUN28 1971

INVENTOR
THOMAS H. DeRIEUX

BY *Melvin L Crane* AGENT

*R Sherason* ATTORNEY

ADJUSTABLE LENS MOUNT

The invention described herein may be manufactured and used by or for the Government of the United States of America for governmental purposes without the payment of any royalties thereon or therefor.

BACKGROUND OF THE INVENTION

Heretofore mirror mounts have been used in which the base is wide and thick such that the mounts may not be positioned close to each other in an optical path. Further problems are brought about by positioning the fine adjustment means on the front or back which protrude in the axial direction of the mount. These adjustment means interfere with close assembly of the mounts and also limit the angle of the mirror because the adjustment means interferes with the optical beam.

BRIEF SUMMARY OF THE INVENTION

This invention relates to mounts for mounting optical elements such as mirrors, lens, prisms, etc. and more particularly to a mount which will permit wide angle optical paths as well as close stacking of various optical elements.

This invention makes use of a gimbal mounted optical element holder in which the fine adjustment means is mounted perpendicular to the axis of the mount for vertical and horizontal adjustment of the mount. The fine adjustment means are mounted at 90° angles relative to each other so that adjustment of either one without the other may provide up-down or sidewise movement. Adjusting each adjustment means relative to each other may adjust the axis at an angle relative to the centerline.

It is therefore an object of the present invention to provide an optical mount which will permit wide angle optical paths and a mount which will permit close stacking of various optical elements along an optical path.

Another object is to provide an optical mount which is easily adjustable when assembled relative to other mounts in an optical path.

Other and more specific objects of the invention will become apparent upon a careful consideration of the following detailed description when taken together with the accompanying drawing.

DETAILED DESCRIPTION

Figure 1:
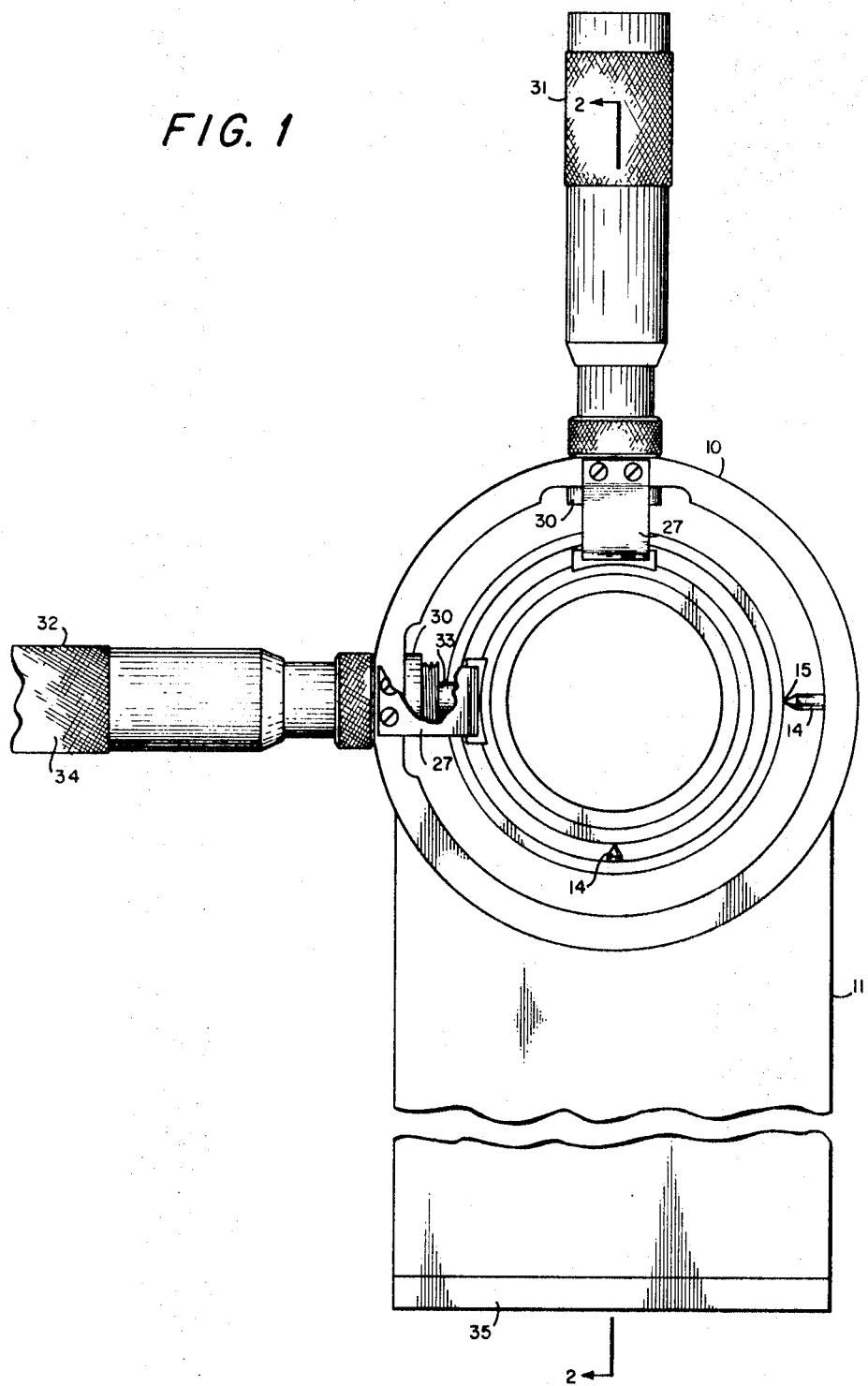
FIG. 1 is a front view illustrating the various parts.
Figure 2:
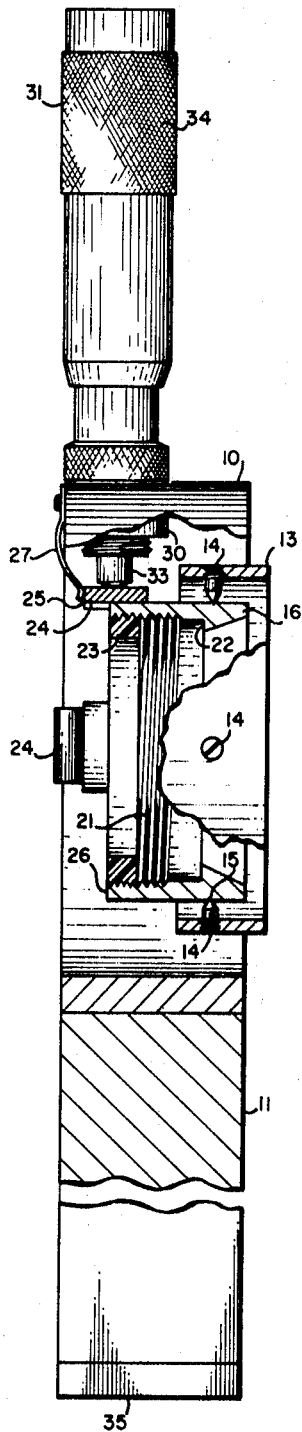
FIG. 2 is a cut away view along lines 2-2 to illustrate the various parts from the side.

Now referring to the drawing, there is shown by illustration an adjustable optical element mount made in accordance with the teaching of this invention. As shown, a cylindrical housing 10 is mounted on a stand or base 11 for the purpose of positioning the mount in an optical system. A ring 13 is pivotally mounted within the cylindrical housing by use of diametrically disposed screws 14 having sharp-pointed conical ends such as Allen setscrews which are threaded through the housing on a horizontal line such that the ring 13 is positioned coaxial with the housing. The ring 13 is provided with diametrically disposed conical holes or indentations 15 for receiving the sharp-pointed conical ends of the screws. Thus, the ring may pivot about the center for movement of the ring such that the center axis will move along a vertical plane. A cylindrical lens mount 16 or optical element holder is mounted within ring 13 by use of diametrically disposed screws 14 having conical sharp-pointed ends such as Allen setscrews threaded through the ring on a vertical line such that the sharp-pointed conical ends of the screws fit into matching conical holes or indentation within the sides of the lens mount 16 near the rear face of the ring. The screws 14 and matching conical holes 15 are arranged such that the lens mount 16 will be positioned coaxial with ring 13 and the housing 10. Thus, the lens mount 16 will swivel about the sharp conical-pointed screws such that the axis of the lens mount will move along a horizontal plane. Thus, the ring 13 and lens mount 16 form a gimbal mount within the housing. The inner surface of the lens mount is cut away from the front and threaded (21) to provide a shoulder 22 near the back to provide means by which an optical element such as a mirror, lens, prism, or any other element may be secured within the lens mount by use of a threaded ring 23. The rear most inner surface of ring 16 may be cut at an angle to permit wide angle operation.

The front-outer surface of the lens mount 16 has separate blocks 24 secured thereto centered on the vertical and horizontal plane such that the blocks are 90° apart. The front faces 25 and the outer surfaces are flat and the front face is set-out front of the front face 26 of the lens mount. A flat spring 27 is secured at one end to the housing on the vertical and horizontal plane opposite the blocks 24 such that the opposite end of the spring engages the block 24 on the front face 25. The springs apply a spring force toward the back of the lens mount.

The lens mount is adjusted by use of two differential micrometers 31 and 32 or differential screws mounted onto the housing ring in the vertical and horizontal plane respectively opposite the blocks 24 by a nut 30 such that the movement of their spindles 33 are perpendicular to the axis of the housing. The micrometers are mounted such that the end of their movable spindle 33 engages the surface 26 of the block 24 on the forward end thereof. The micrometers are set such that when their ends engage the blocks 24, the axis of the lens mount is aligned with the axis of the housing. In this position, the reading of the micrometer is adjusted to 0.005 inch or any other desired value such that the spindle may be moved in either direction while moving the lens mount. When the thimble 34 of micrometer 31 is rotated the lens mount is rotated such that the axis is shifted in either an up or down position along the vertical plane by rotation of ring 13 about its swivel points. When the thimble of micrometer 32 is rotated in either direction, the axis of the lens mount is moved along a horizontal plane in a side wise movement. When moved by micrometer 32, the lens mount pivots about swivel mounts engaging the side of the lens mount. The springs force the lens mount toward the back such that a force is always applied onto the spindle of the micrometers. Thus, the front of the lens mount will move as the micrometer spindle is rotated. The ring 13 and lens mount 16 are not moved bodily in either the vertical or horizontal plane, however; they are rotated about their pivot pints such that their axis is rotated in a plane relative to the axis of the cylindrical housing. The base has been provided with a plate of magnetic material 35 for securing the lens holder in place if desired.

In operation of the lens mount, an optical element such as a lens, prism, mirror, or any other suitable element is secured in the lens mount. Each of the micrometer readings are set at 0.005 inch or any other desired value which aligns the lens axis with the axis of the housing. For shifting of the lens axis in the vertical plane, micrometer 31 is rotated to move the front end of the lens mounting ring relative to the pivot points. Rotation of the micrometer spindle in a direction toward the axis of the housing will move the front end of the lens mount downwardly, thereby shifting the axis of the lens such that the axis is off the housing axis. Rotation of the spindle upwardly permits the front face of the lens mount to move upwardly by the force of the spring on the lens mount, thereby shifting the axis in a vertical plane off the housing axis. Rotation of micrometer 32 in either direction will shift the axis of the lens mount off the housing axis in the horizontal plane, the direction depending on the direction of rotation of the spindle. The lens mount axis may be shifted off the vertical and horizontal axis by simultaneously rotating each of the micrometers or either by rotation of one micrometer letting that one remain in place and then rotating the other micrometer. Thus, the axis of the lens mount may be shifted to any position relative to the axis of the housing. Since micrometers are being used the adjustments may be very small and very accurate.

It is obvious that the relationship of the movement of the axis of the lens mount with respect to the axis of the housing will depend on the linear distance between the pivot point of the lens mount and the point at which the micrometer exerts a force on the lens mount. Thus, the width of the lens mount may control the angular adjustment of the lens mount. Also, the micrometers are secured to the housing perpendicular to the axis; therefore, the micrometers will not interfere with the angular setting of the axis of the lens mount.

Obviously many modifications and variations of the present invention are possible in light of the above teachings. It is therefore to be understood that within the scope of the appended claims the invention may be practiced otherwise than as specifically described.

I claim:

1. An adjustable lens mount for adjusting the optical axis of a lens relative to the axis of a housing such that the axis of the lens may be aligned with the axis of the housing or at an angle relative to the axis of the housing; which comprises, a housing, first and second concentric rings pivotably mounted within said housing in axial alignment therewith, said first ring pivotably secured within said housing, said second ring pivotably secured within said first ring, said first and second rings each having diametrically opposed pivot points in which the pivot points of each respective ring are at 90° angles relative to the pivot points of the other ring of said rings, first and second adjusting means secured to said housing relative to said first and second rings in spaced relationship at an angle of 90° relative to each other and in a plane perpendicular to the axis of said housing, said first adjusting means operative for adjustment of the optical axis of said lens at an angle relative to the axis of said housing in a plane through the pivots of said second ring, said second adjusting means operative for adjustment of the optical axis of said lens at an angle relative to the axis of said housing in a plane through the pivots of said first ring, said first and second adjusting means operative for adjustment of the optical axis of said lens at an angle relative to the axis of said housing and the planes through said pivots of said rings, and whereby the optical axis of said lens may be adjusted to an angle relative to the axis of said lens may be adjusted to an angle relative to the axis of said housing in any quadrant about said axis.

2. A fine adjustment mount as claimed in claim 1, wherein, said pivot points of said first ring lie in the vertical plane through the axis of said housing.

3. A fine adjustment mount as claimed in claim 2; wherein, said pivot point of said first ring lies in the horizontal plane through the axis of said housing.

4. A fine adjustment mount as claimed in claim 1; wherein, said adjusting means are separate micrometers.